(12) United States Patent
Koenig

(10) Patent No.: US 11,373,219 B2
(45) Date of Patent: Jun. 28, 2022

(54) SYSTEM AND METHOD FOR PROVIDING A PROFILED VIDEO PREVIEW AND RECOMMENDATION PORTAL

(71) Applicant: Eric Koenig, Huntington, NY (US)

(72) Inventor: Eric Koenig, Huntington, NY (US)

(*) Notice: Subject to any disclaimer, the term of this patent is extended or adjusted under 35 U.S.C. 154(b) by 293 days.

(21) Appl. No.: 15/236,382

(22) Filed: Aug. 12, 2016

(65) Prior Publication Data
US 2018/0047070 A1    Feb. 15, 2018

(51) Int. Cl.
*G06Q 30/02* (2012.01)
*G06Q 50/00* (2012.01)
*G06N 20/00* (2019.01)

(52) U.S. Cl.
CPC ......... *G06Q 30/0282* (2013.01); *G06N 20/00* (2019.01); *G06Q 50/01* (2013.01)

(58) Field of Classification Search
CPC ..... G06Q 50/01; G06Q 30/0282; G06N 20/00
USPC ......................................................... 705/319
See application file for complete search history.

(56) References Cited

U.S. PATENT DOCUMENTS

| | | | | |
|---|---|---|---|---|
| 6,731,307 B1* | 5/2004 | Strubbe | ........... | G06N 3/004 704/E17.002 |
| 8,060,463 B1* | 11/2011 | Spiegel | ........... | G06F 16/285 707/609 |
| 8,655,796 B2* | 2/2014 | Udani | ........... | G16H 10/20 705/342 |
| 2004/0249811 A1* | 12/2004 | Shostack | ........... | G06Q 30/02 |
| 2007/0032240 A1* | 2/2007 | Finnegan | ........... | H04W 4/21 455/445 |
| 2007/0079321 A1* | 4/2007 | Ott | ........... | H04H 60/73 725/18 |
| 2007/0112837 A1* | 5/2007 | Houh | ........... | G06F 16/41 |
| 2008/0294624 A1* | 11/2008 | Kanigsberg | ........ | G06Q 30/0625 |
| 2014/0074824 A1* | 3/2014 | Rad | ........... | G06Q 10/10 707/722 |
| 2015/0156268 A1* | 6/2015 | Lev | ........... | H04L 51/32 709/204 |

(Continued)

OTHER PUBLICATIONS

C. Kofler, S. Bhattacharya, M. Larson, T. Chen, A. Hanjalic and S.-F. Chang, "Uploader Intent for Online Video: Typology, Inference, and Applications," in IEEE Transactions on Multimedia, vol. 17, No. 8, pp. 1200-1212, Aug. 2015, doi: 10.1109/TMM.2015.2445573 (Year: 2015).*

*Primary Examiner* — Richard W. Crandall
*Assistant Examiner* — Wenren Chen
(74) *Attorney, Agent, or Firm* — Georgiy L. Khayet

(57) ABSTRACT

A computerized matching system enable users to utilize video clips to promote and/or find a person/people, place, or consumer item. The system is a recommendation service, embodied preferably in a mobile app, suggesting potential matches for its users. These suggestions are based upon the information and data entered by the users in their user profiles, as well as their Ideal Match Criteria (i.e. what it is they are seeking). The suggestions are also based upon algorithms that analyze and learn from available rating history data to make predictions on potential matches, utilizing rating trends of that user (i.e. the prior ratings entered by that user during their usage of the system while viewing other videos) as well as the rating trends of other users who have rated the same videos in a similar manner (herein referred to as Similar Rating Groups, or SRGs).

20 Claims, 10 Drawing Sheets

(56) References Cited

U.S. PATENT DOCUMENTS

2015/0207765 A1\* 7/2015 Brantingham ........ H04L 51/046
 715/758
2016/0171971 A1\* 6/2016 Suskind .............. G06F 19/3481
 704/260
2016/0246790 A1\* 8/2016 Cowdrey .............. G06F 16/285
2016/0358096 A1\* 12/2016 Bannur ................ G06F 16/907

\* cited by examiner

A.

B.

C.

IF:

D.

THEN:

SYSTEM AND METHOD FOR PROVIDING A PROFILED VIDEO PREVIEW AND RECOMMENDATION PORTAL

CROSS-REFERENCES TO RELATED APPLICATIONS (IF ANY)

This application claims benefit under 35 USC § 119(e) of provisional patent application No. 62/231,360 filed Apr. 1, 2015. The '360 application is incorporated by reference herein.

BACKGROUND

1. Field of the Invention

The field of the invention is a method and system for profile preview and recommendation, specifically applications that uses matches and weights.

2. Description of Prior Art

The invention is based upon introductory systems whereby individuals can find and contact each other over the Internet, usually with the objective of developing a personal relationship, seeking employment, or selling a good or service. These introductory systems usually operate over the Internet, through the use of PCs or mobile devices, such as cell phones. Users of these introductory systems would usually provide personal information, to enable them to search the service provider's database for other individuals, goods, and/or services. Members use search criteria that is processed and then paired with the information provided by other members, to enable optimal matching.

Currently, there is no such service that provides the ability to preview—and simultaneously rate—the individuals, goods, locations, and/or services in real time, as well as receive recommendations based upon their profiled data and based upon their ongoing interaction with the system.

There is still room for improvement in the art.

SUMMARY OF THE INVENTION

It is an object of the invention to provide the ability to preview—and simultaneously rate—the individuals, goods, locations, and/or services in real time through, for example, video clips.

It is another object of the invention to enable users to communicate via the system, for example but not limited to in-app text chat or video-based calling.

It is yet another object of the invention to offer recommendations based upon a user's profiled data.

It is yet another object of the invention to offer recommendations based upon multiple users' profiled data, for example, but not limited to, shared interests and hobbies.

It is yet another object of the invention to offer recommendations based upon a user's ongoing interaction (i.e. usage history) with the system.

It is yet another object of the invention to offer recommendations while a user engages with the system (i.e. in real time).

It is yet another object of the invention to offer recommendations based upon a user's profiled data and a user's ongoing interaction with the system, while that user engages with the system.

The current invention would enable users to utilize video clips to promote and/or find a person/people, place, or thing.

At its core, the inventive system is a recommendation service, embodied preferably in a mobile application, suggesting potential matches for its users. These suggestions are based upon the information and data entered by the users in their user profiles, as well as their Ideal Match Criteria (i.e. what it is they are seeking). The suggestions are also based upon algorithms that analyze and learn from available rating history data to make predictions on potential matches, utilizing rating trends of that user (i.e. the prior ratings entered by that user during their usage of the system while viewing other videos) as well as the rating trends of other users who have rated the same videos in a similar manner (herein referred to as Similar Rating Groups, or SRGs). These suggestions could also be in the form of helpful hints, tips, and tutorials to assist the user optimize their experience with the system, for example improving the first impression they are making to other users.

The inventive system and method can be applied to multiple product categories, industries, and vertical markets. Each of the vertical markets will feature the same basic software engine (i.e. core functionality), but with different design elements, and feedback criteria (i.e. ratings) related to each specific market and/or industry.

The services provided by the inventive system and method may be offered as a consumer-to-consumer venue, whereby peers market to each other, or offered as a business-to-consumer or business-to-business venue, whereby advertisers market to consumers.

The inventive system will also feature an in-app "Digital Assistant" (aka the "Concierge"). The Concierge begins to offer profiled suggestions once a match is made, and the users start communicating through in-app messaging or live video chat. For example, but not limited to, the Dating Concierge (i.e. the "Concierge" for a mobile dating application of the inventive system) may provide assistance in breaking the ice, by prompting the users with common interest suggestions, or conversation points, based upon the shared interests found in each user's profile. These topics will be served up at set intervals, either in their text chat or at the bottom of their live video chat. These timed intervals may be predetermined by the system or selected by the user. The Concierge can provide tips or assistance even when the users are not in communication with each other even when the users are off-line.

These topics will also be served up based upon the detection of key words, terms, and/or phrases, either in the users' text-based interaction or spoken communication. These key phrase recommendations may be delivered in real time (i.e. during the dialogue, as it is detected), or at a later time (i.e. after the software and associated analytics have had sufficient time to process the data and determine adequate and relevant recommendations).

For example, in the dating and dining embodiments of the system, these profiled recommendations may include, but are not limited to, non-sponsored, web-sourced restaurants, movie theaters, travel destinations, bands, real estate locations, entertainment venues, and other businesses or commercial opportunities. The Concierge may also be able to make profiled paid recommendations that feature sponsored local businesses and national retailers (e.g., Starbucks™ Chili's™, Regal Cinema™, Hilton Hotels™, Delta Airlines™, Nike™, Revlon™, etc.). This enables the users to return for multiple uses of the mobile dating or dining applications, as after the initial in-person encounter (i.e. a date—in a dating application), they can use the profiled recommendations for suggestions on where to go for subsequent dates, as well as receive discount and/or promotional coupons from these paid sponsors and/or advertisers.

For example, in a job placement embodiment of the system, these profiled recommendations may include, but are not limited to non-sponsored, web-sourced businesses, as well as paid sponsored local businesses and national retailers (e.g., Macy's™, JoS. A. Bank™ Norelco™, Ray Ban™, Samsonite™, Apple™, Mont Blanc™, etc.). Much like with the dating and dining embodiments, users could return to the app for ongoing tips and recommendations.

The innovative process is more efficient, effective, accurate and functional than the current art.

BRIEF DESCRIPTION OF THE DRAWINGS

Without restricting the full scope of this invention, the preferred form of this invention is illustrated in the following drawings.

DESCRIPTION OF THE PREFERRED EMBODIMENT

There are a number of significant design features and improvements incorporated within the invention.

The present invention is for a computer-based system for aiding in performing a method for providing a profiled video preview portal, comprising the steps of generating a profile for an individual user, based upon a plurality of personalized data, creating a video to promote an individual, good, and/or service; and tagging (i.e. labeling) the user profile with terms used to distinguish and identify said user profile, and uploading said profile and video to a centralized server 400 as shown in FIGS. 1-9.

Figure 10:
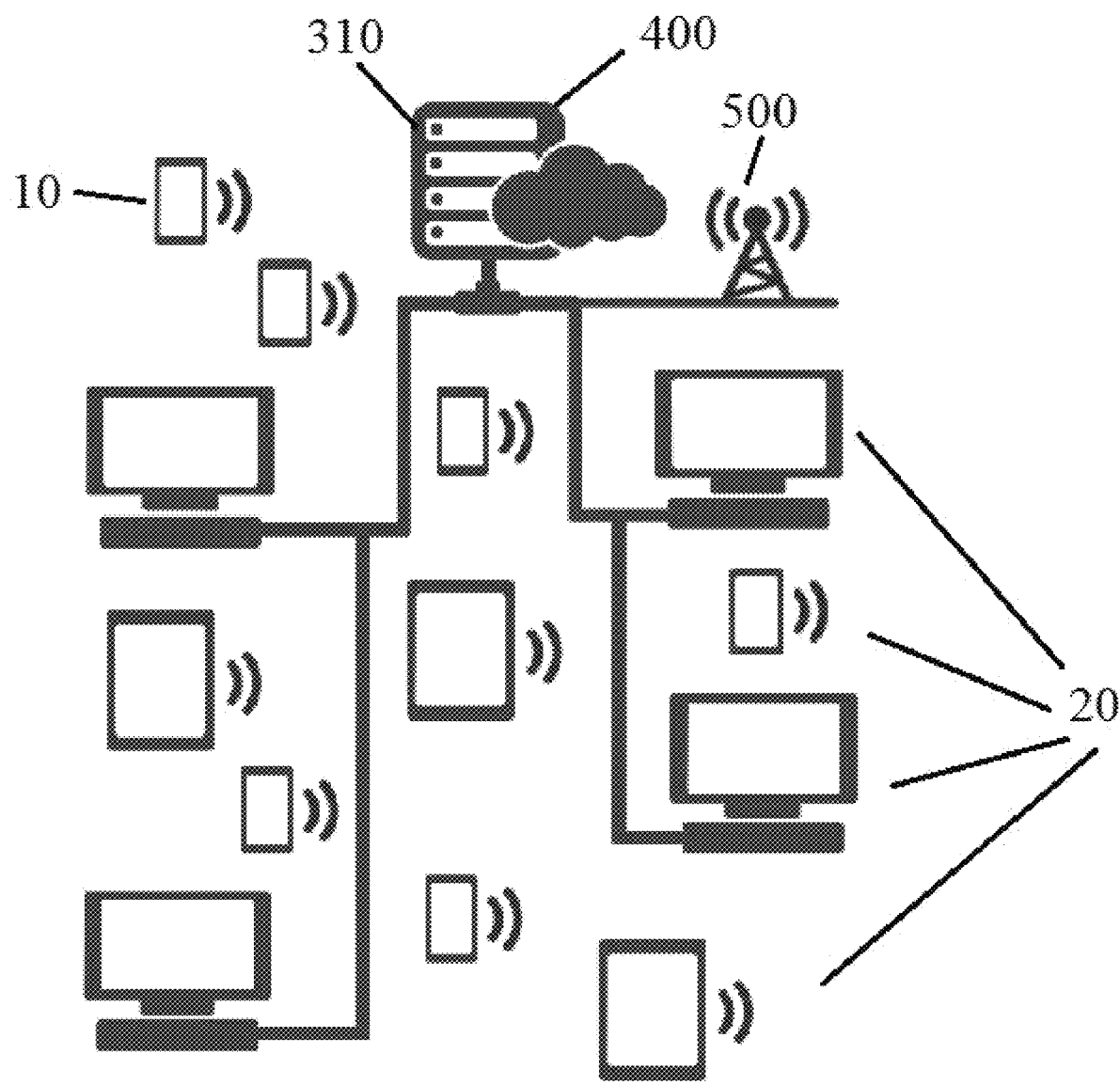
FIG. 10 is a computer system diagram showing interne access and connectivity to a central server.

FIG. 10 displays the preferred embodiment of the system architecture accessed through an Internet, Intranet and/or Wireless network 500. However, the system could be implemented on a device-to-device or client/server architecture as well.

In FIG. 10, the system is accessed from a user's computing device 10 through a web browser over HTTP and/or HTTPS protocols 500 or wireless network or cell phone to cell phone connection. A computing device 20, such as a cell phone, that can access the system 1 must have some version of a CPU, CPU memory, local hard disk, keyboard/keypad/input and display unit. The computing device 20 can be any desktop, laptop, tablet, smart phone or general purpose computing device with an appropriate amount of memory suitable for this purpose and an active connection to the Internet 500.

Computing devices like this are well known in the art and are not pertinent to the invention. The computing devices 20 can serve as an input/output (I/O) device for inputting an original writing and video from a user and for outputting a modified writing and video.

The system 1, data and processing code can reside in the non-transitory memory 310 of the one or more computing devices. The system 1 in the preferred embodiment would be written to act like a smart phone application (app).

In one embodiment of the inventive system, a user would first register with the system and set up a user profile, to include but not limited to name, gender, date of birth, location, and other relevant information, related to the specific use of that application. For example, in a job application, the user may also enter their qualifications and skillsets, while, in a dating application, a user may also enter their profession, hobbies, and interests. In some embodiments, the user may select their preferred language, such that all content displayed and/or presented may be translated into said selected language.

Next, the user would upload a video clip to the centralized server 400 (i.e. "cloud"), via a device such as but not limited to a mobile device 20, to promote themselves and/or goods/services they are offering—for example but not limited to real estate, home repair, entertainment, travel, sports, dining, etc. In other words, the video may be for the purposes of, for example but not limited to, seeking a personal relationship, selling a product or service, searching for employment, or promoting a business.

This inventive computer-based system also aids in performing a method for providing a profiled video preview portal, comprising the steps of allowing users to search the profile and/or video stored via the centralized server 400 for individuals, goods, and/or services. This is accomplished by entering search criteria, matching search terms with related identifying tags, and then displaying matched videos to the user who initiated the search.

The users "tag" their profiles and/or videos by entering descriptive terms about the item being promoted in the video. These are then used as reference terms, such that when other users enter those terms in their preferred search criteria, that video would then be matched (for example, in the dining mobile application, any video labeled "Thai" would appear to a user who enters "Thai" as a search preference). These profiles and videos are displayed to any user of the system who enters a certain set of matching criteria. For example, within said compatibility/matching protocol, a series of matching algorithms will be used that would match the search terms entered by a first user with the identifying tags used by other users.

Once these algorithms have processed the relevant data, the system and method identifies suitable matches (i.e. those users, businesses, and/or products/services that fit the required matching criteria), and then places these matches in each other's feeds (i.e. a continual stream of selected videos displayed via short descriptions and/or thumbnail images).

The users then have the ability to view these videos in order to preview the associated individual, good, and/or service being promoted, by selecting the short description and/or thumbnail from their feed and opening the full video.

This inventive computer-based system further aids in performing a method for providing a profiled video preview portal, comprising the steps of allowing users to view these videos once they have been matched, and giving the video a satisfactory or unsatisfactory rating, wherein a satisfactory rating would enable continued interaction and an unsatisfactory rating would cease interaction.

This inventive computer-based system aids in performing a method for providing a profiled video preview portal, further comprising the step of giving the video a numerical rating (for example, but not limited to selecting 7 stars out of a possible 10 stars) in one attribute category or a series of attribute categories.

This rating system would consist of a plurality of attribute categories related to the item in the video. For example, a user viewing a prospective date or employee may gauge appearance, composure, personality, etc., whereas a user viewing a prospective new car may gauge style, wear, upkeep, engine sound, exhaust smoke, etc.

This feedback is received by the system, stored in non-transitory memory (via the centralized server 400), and processed/analyzed in order to ascertain how the user reacts to the videos they are viewing. This data is used by the system to group users together based upon similar rating history (i.e. users who rate the same videos in the same manner will be grouped into Similar Rating Groups, or SRGs). Users in the same SRGs will be shown the same videos because the system has determined they have similar interests—but as the users engage with the system and the available data is updated, the users' SRGs may be adjusted by the system.

This is done so the most optimal or desired matches are presented to each user. In this way, not only will the system display the content to the user that they have explicitly searched for or requested, but through predictive analytics and adaptive logic, the user's profile will be updated and videos will be displayed based upon the learned interests of that user, as determined by the inventive system's artificial intelligence (AI).

This inventive computer-based system further aids in performing a method for providing a profiled video preview portal, comprising the steps of allowing users to continue interaction upon completion of the preview video, for example but not limited to in-app chat or video call in real time. In some embodiments, this step might require mutual consent to continue, such as with a dating application for example, while a job placement system application (app) might only require one side's consent to continue communications via the app.

This inventive computer-based system further aids in performing a method for providing a profiled video preview portal, comprising the steps of providing the user or group of users with personalized recommendations (based upon the data contained in their user profiles), as they engage with the system (e.g. provide information, record videos, etc.) or as they interact with each other (e.g. in-app chat, video call, etc.)

The system will also utilize any and all possible technology available at that time to provide to its users the ability to improve their video posts, by the way of personalized tutorials. These tutorials will take the data aggregated from the user's interaction with the system (both the information directly inputted by the user, as well as the information accumulated through the system's use of predictive analytics). For example, if a user of the dating application or job assistance application is receiving negative feedback, the system could analyze the trend(s) and offer suggestions on how to better improve their video.

Any purchases made by users within the inventive system may be made a la carte, via a recurring subscription/premium plan, or some combination thereof. Additionally, purchases may be made via in-platform digital currency, such as a token, with tokens available for purchase via legal tender, or in exchange for performing in-app tasks, such as, for example but not limited to viewing advertising or entering user data.

Figure 1:
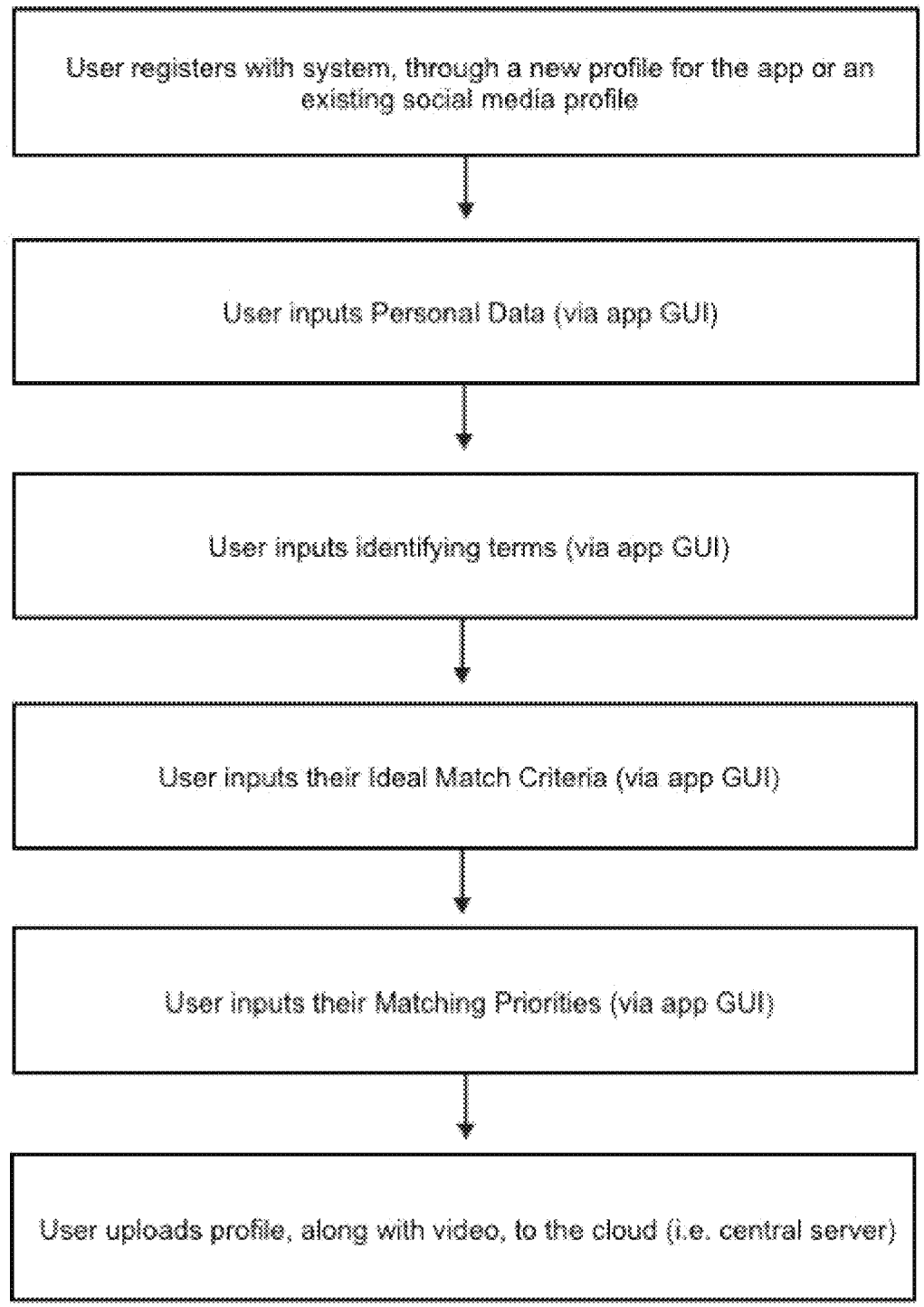
FIG. 1 is a flow chart of one embodiment of the present invention for user input of data.

Description of Illustrations which show the system being used for a dating application is as follows:

In FIG. 1, a dating embodiment of the inventive system is shown, wherein a user first registers with the system, through a new profile for the mobile application or an existing social media profile. Then, they input their Personal Data (via a mobile application GUI), as well as input any relevant identifying terms (also via the mobile application GUI). Next, the user would input their Ideal Match Criteria (via the mobile application GUI), before setting their Matching Priorities (via the mobile application GUI). The user then uploads their completed profile, along with their recorded video clip, to the cloud (i.e. central server 400).

Figure 2:
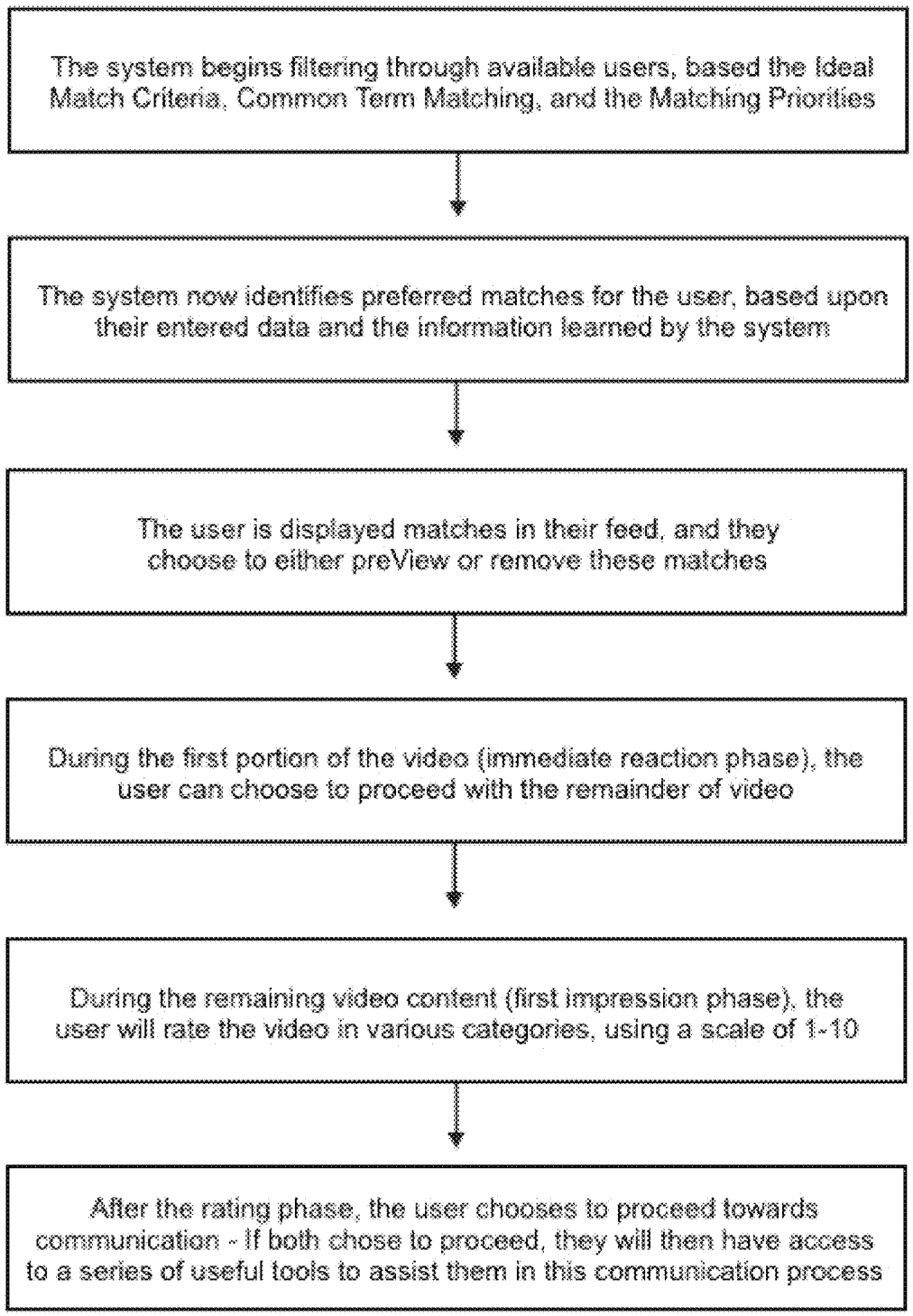
FIG. 2 is a flow chart continuation of FIG. 1 for system display of matches to a user.

In FIG. 2, the system begins filtering through available users, based upon the Ideal Match Criteria, Common Term Matching, Distance, and the Matching Priorities. This process is accomplished through four unique sorting filters:

1. Common Term Matching: The system analyzes all terms (from a list of available options presented by that mobile application) entered by two or more users, and the percentage of common terms (e.g. those terms found in both users) is determined and represented, for example, as a number between 1 and 10 (e.g. a 70% match of terms would be represented as a 7).

2. Ideal Match Criteria: The inventive system will analyze the data provided by the users in order to define their ideal match, which will be completed using the options given by the mobile application (for example, with a dating application, those options might include gender, age, distance, height, hair color, eye color, etc., while a job placement application might offer the options of field, profession, entry level, distance, salary, etc.), with the percentage of matching criteria (i.e. meeting all criteria would equal a 100% match) also represented on a scale of 1-10 (e.g. 60% of the Ideal Match Criteria Interests=6), for example.

3. Distance: The system will determine the distance between the two or more users in mileage or other forms of measurement. If this item is given high priority, users who are closer will be matched; if this item is given lower priority, users who are not that close will still be matched. This may or may not be limited to a single country. The system will have International versions where the distance is not limited to a single country which allow users to communicate with others around the world.

4. Attribute Category Communal Feedback: Once a user has been participating within the application for a period of time (e.g. 1 month) the system will use the communal rating histories of other users when identifying potential matches. Users who rate similarly will be placed in a group and shown many of the same potential matches. In this instance, the percentage of this Similar Ratings Group (SRG) who rated a certain way will be represented on a scale of 1-10 (e.g. 80% of the group=8).

The system will utilize the four above Matching Priorities as set by each user in order to identify the most ideal matches, based upon the following formulas.

In one embodiment the following formula may be used:
if the #1 priority is ≥7, the user will be fed that match
if the #1 priority is <7, the system will look at the #2 priority—if the #2 priority is ≥8, the user will be fed that match
if the #2 priority is <8, the system will look at the #3 priority—if the #3 priority is ≥9, the user will be fed that match
if the #3 priority is <9, the system will look at the #4 priority—if the #4 priority is =10, the user will be fed that match
if the #4 priority is <10, the user will be not be fed that match An alternative weighting formula may be offered to users of the inventive system in another embodiment, where by the following formula is observed:
if the #1 priority is ≥7, the user will be fed that match
if the #1 priority is <7, the user will not be fed that match
In yet another embodiment, the following alternative weighting formula may be offered to users of the inventive system:
if the #1 priority is ≤2, the user will be fed that match
if the #1 priority is >2, the user will not be fed that match
These priority rankings may be predetermined by the system or selected by the user. For example, the user may desire an opposites attract approach where the user will be fed matches where the matches are less than a set point like 3. This could be a unique offering for the system when it is used for dating matches and recommendations.

The system is designed to identify the preferred matches for the user, based upon their entered data and the information learned by the system. Those potential matches are then displayed in that user's feed, and they have the option to either preview or remove these matches. In one embodiment, once they select to view the video and it begins to play, the user will be given the option to proceed with the remainder of the video within the first portion of the video (this is known as the "Instant Reaction" phase).

If both users select to proceed with the remainder of the video (e.g. the entire system may be based upon mutual interest at each step), the user will rate the match in one or more categories, using a scale of 1-10 (this is known as the "First Impression" phase).

In another embodiment, once the user selects to view the video and it begins to play, the user will proceed directly to the "First Impression" phase, where they will rate the match in one or more categories, using a scale of 1-10.

After the rating phase, the user chooses to proceed towards communication—again, if both chose to proceed, they will then have access to a series of useful tools to assist them in this communication process. If not, the communication is terminated.

Figure 3:
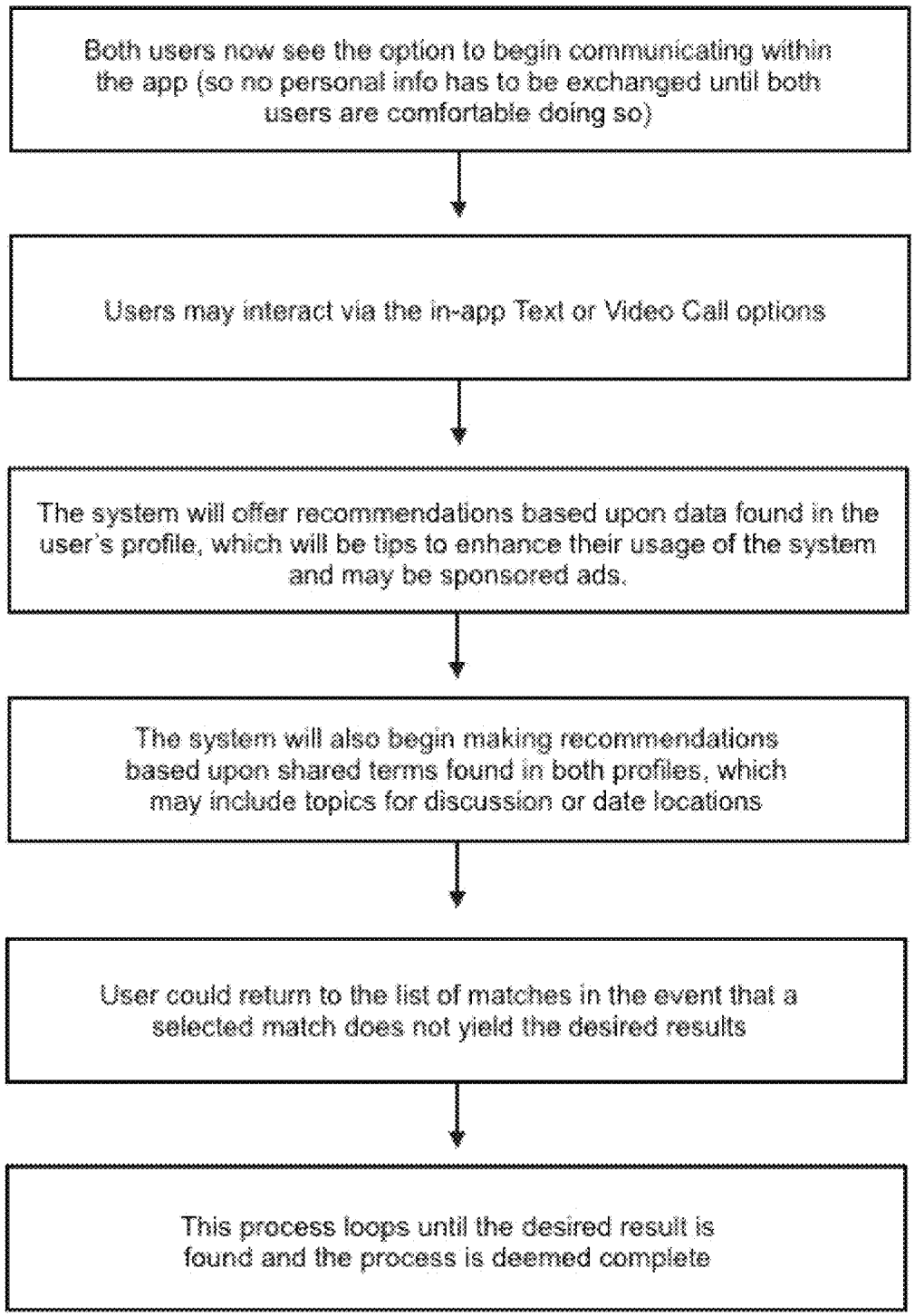
FIG. 3 is a flow chart continuation of FIGS. 1 and 2 for user interaction with computer generated matching data.

In FIG. 3, both users have agreed to begin direct communication and now see the option to dialogue through the application (so no personal info has to be exchanged until both users are comfortable doing so). For example, users may interact via the in-app Text or Video Call options. The system will offer recommendations based upon data found in the user's profile, which will be tips to enhance their usage of the system and may be sponsored ads. The system will also begin making recommendations based upon shared terms found in both profiles, and may contain topics for discussion or date suggestions (for example). A user could return to the list of matches in the event that a selected match does not yield the desired results. This process loops until the desired result is found and the process is deemed complete.

Figure 4:
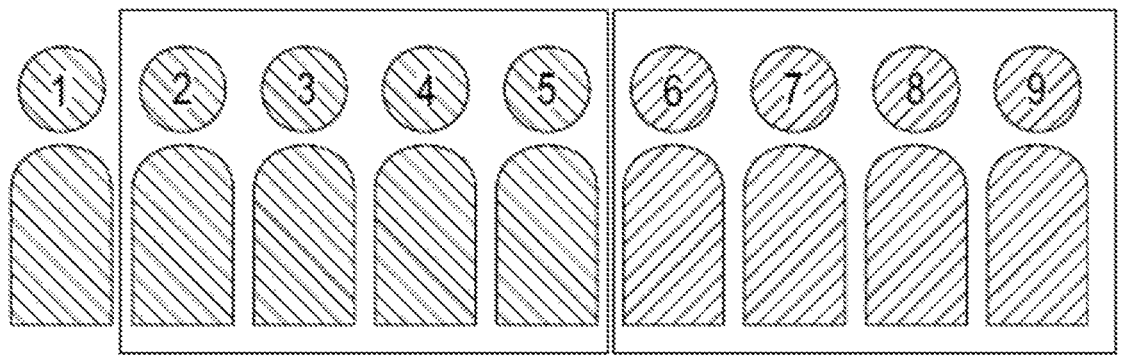
FIG. 4 is a block diagram of matched data.
Figure 4:
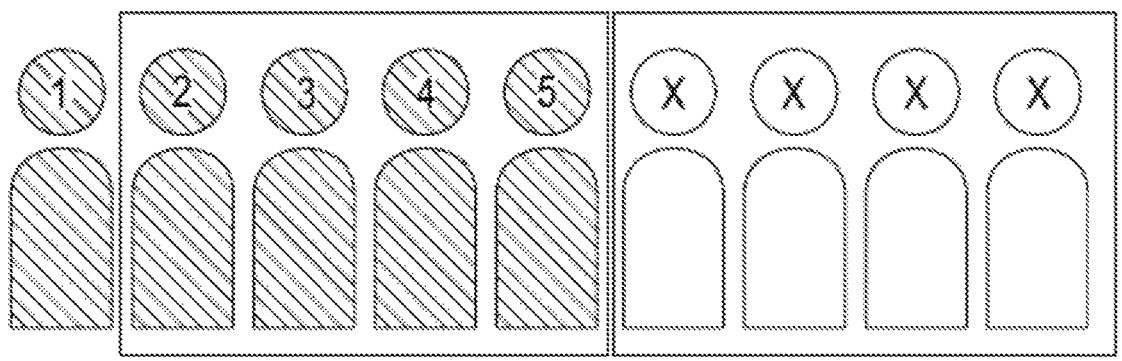
Figure 4:
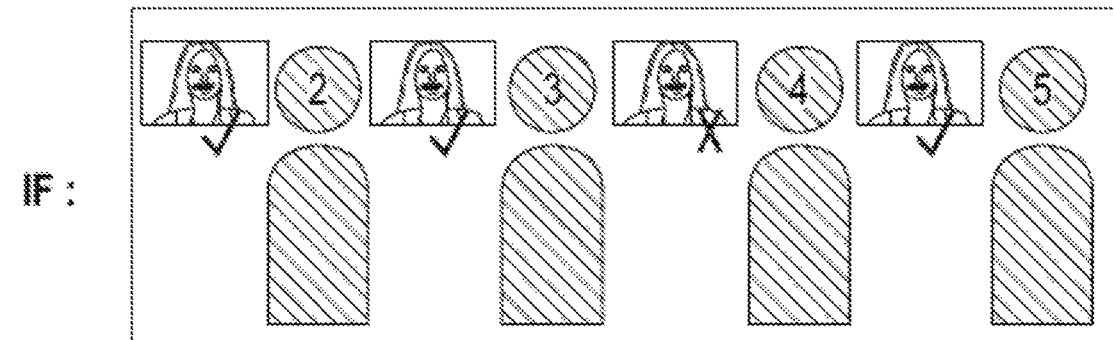
Figure 4:
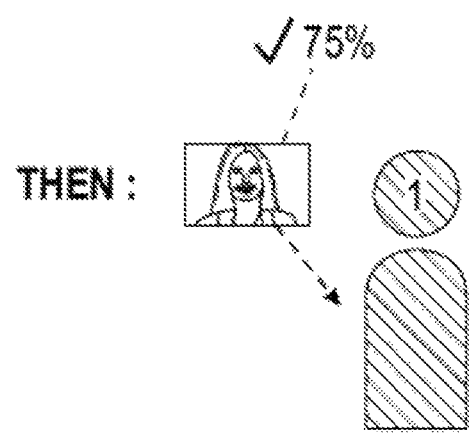

The system will recommend matches based on similar rating habits and history, as illustrated in FIG. 4. In FIG. 4 line A, users who react similar to the same videos will be considered to have similar tastes, and therefore the algorithms will consider their rating history to be relevant (in this illustration, Users 1-5 are placed in one group, as they rated the same videos in a similar manner), while users with dissimilar rating histories will be considered irrelevant, as shown in FIG. 4 line B (i.e. Users 6-9 rate dissimilar to User 1, so their rating habits are of little concern to the system when determining matches for User 1). Based upon this assessment, the system determines that since Users 2, 3, and 5 rate a match favorably (FIG. 4 line C), then User 1 will be shown this match (FIG. 4 line D), even though User 4 reacted unfavorably—the 75% of the group would qualify the match, based upon the ranking priority.

Figure 5:
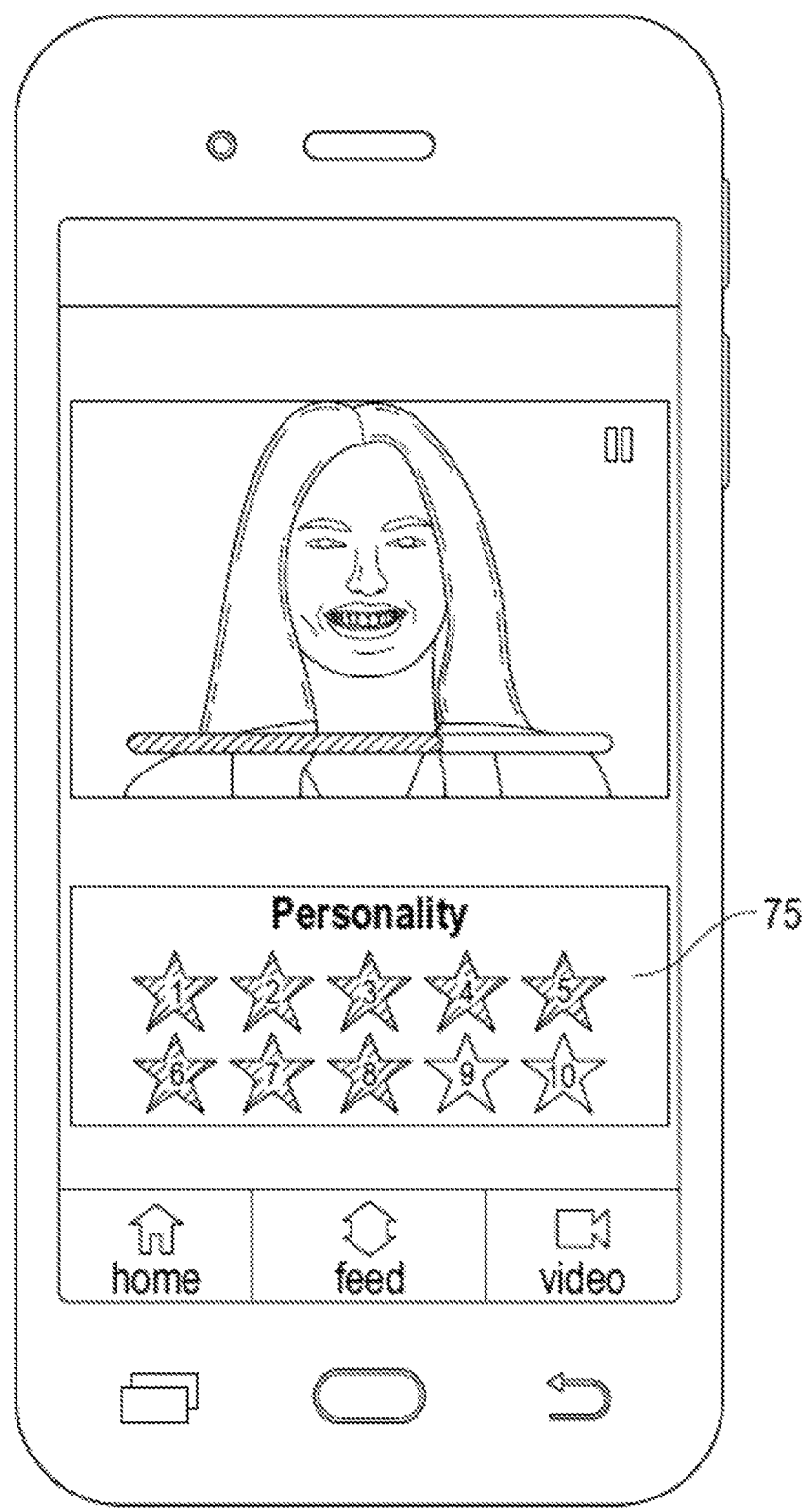
FIGS. 5-9 are screen shots of matched data displayed to a user.

An embodiment of the rating interface 75 is displayed in FIG. 5 for the dating application, in which a user might rate another user on Personality, amongst other categories, for example.

Figure 6:
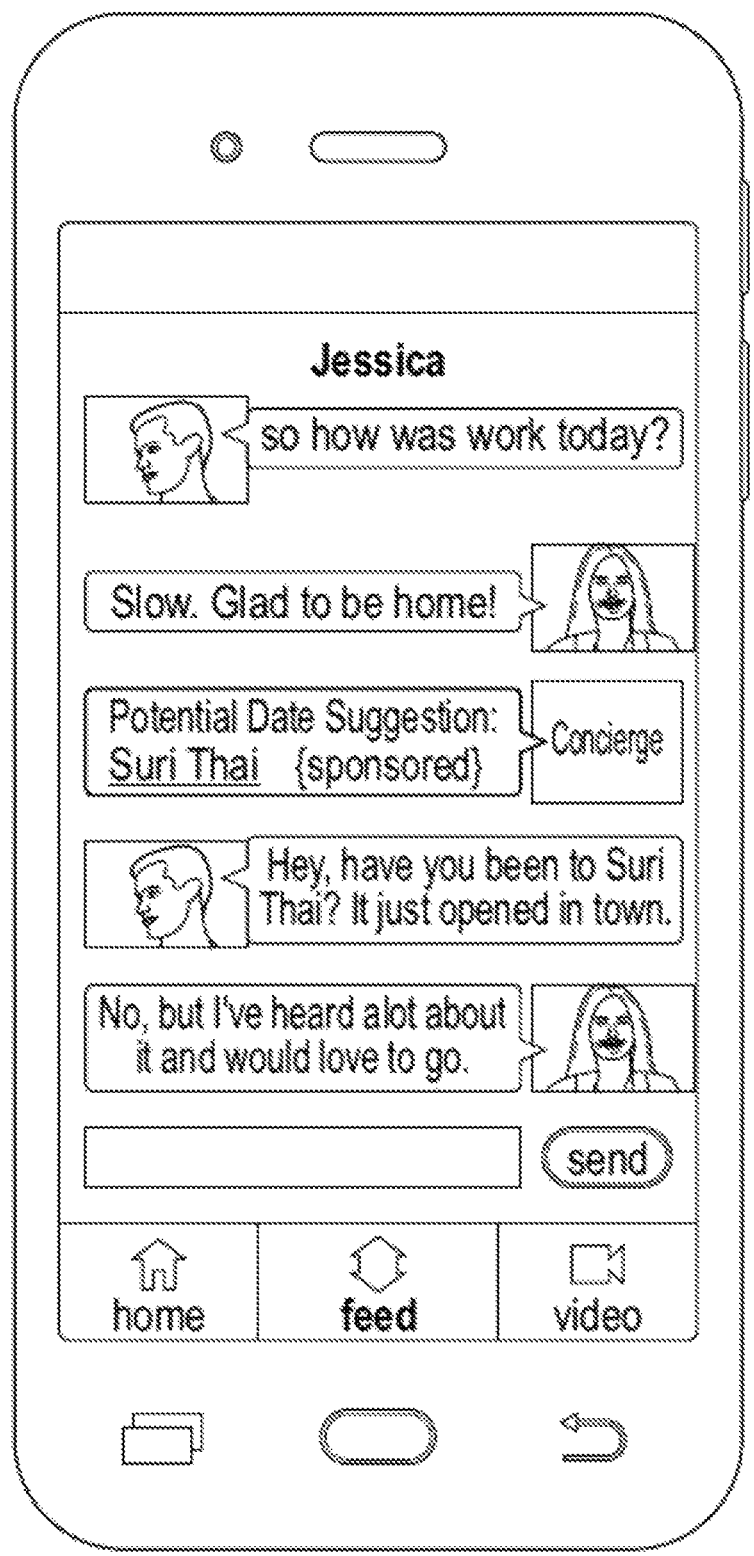
Figure 7:
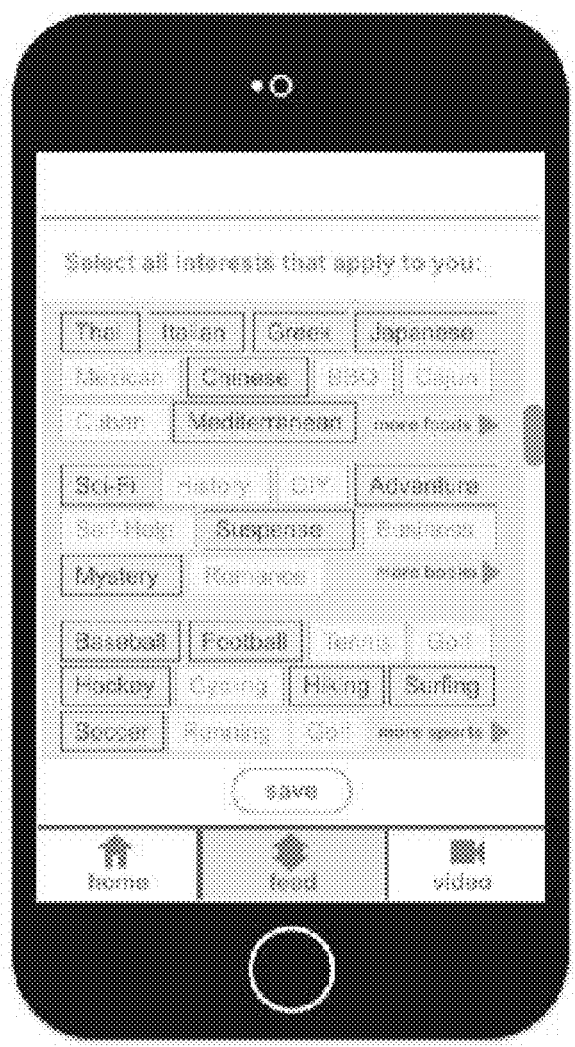

An embodiment of the virtual Concierge for the dating application is displayed in FIG. 6, wherein two users who have begun to converse 70 via an in-app text-based chat after expressing mutual interest are shown recommended dating suggestions, based upon the shared common interests in both users' profiles (FIG. 7).

Figure 8:
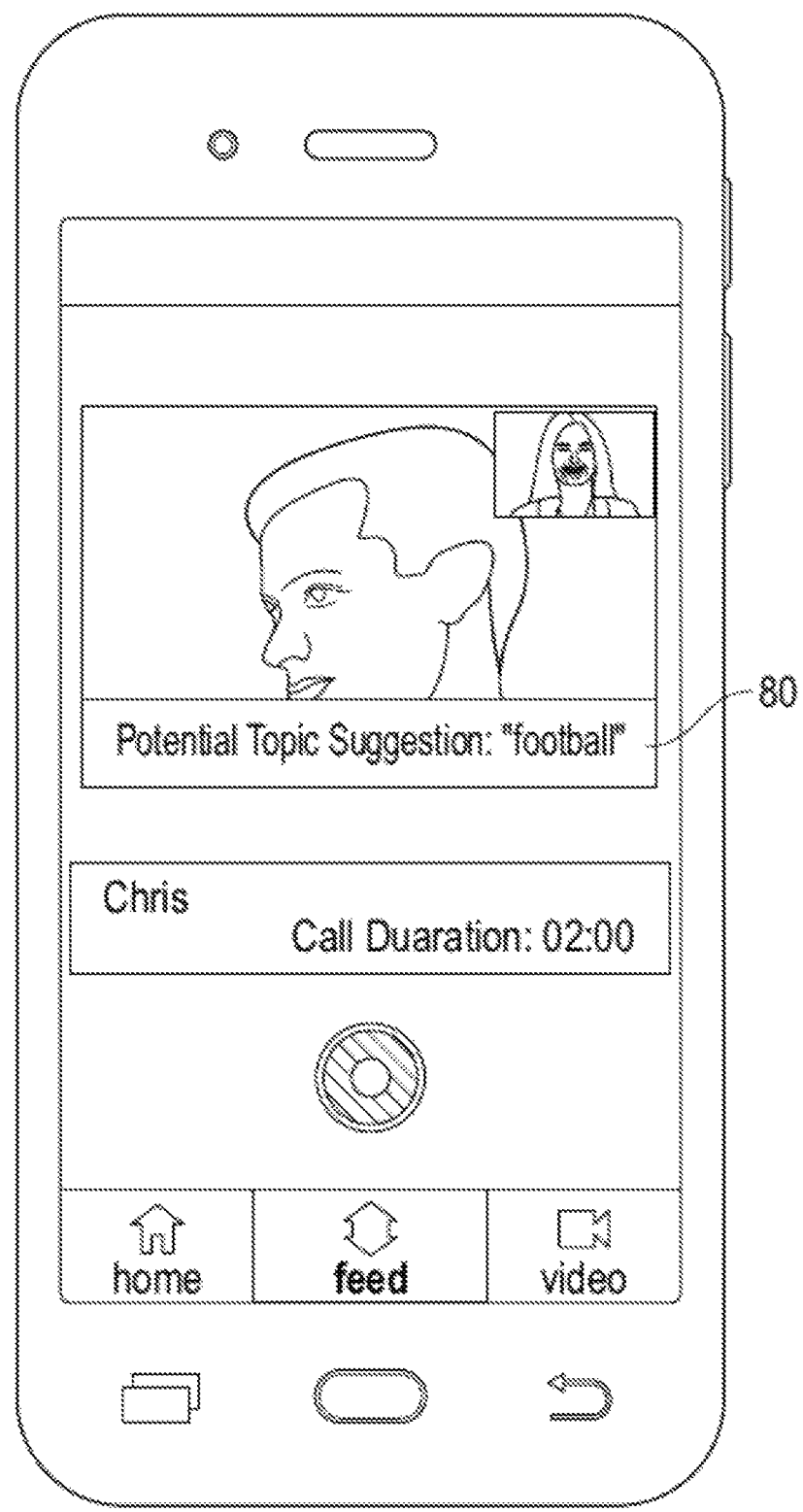

In FIG. 8, the Concierge in the dating embodiment is shown making conversation recommendations 80 (i.e. topics for discussion), also based upon the shared common interests in both users' profiles, to assist these users in their communications. In this scenario, these topics are displayed to the users, who have begun to converse via an in-app video-based call after they have both mutually expressed interest in the other.

Figure 9:
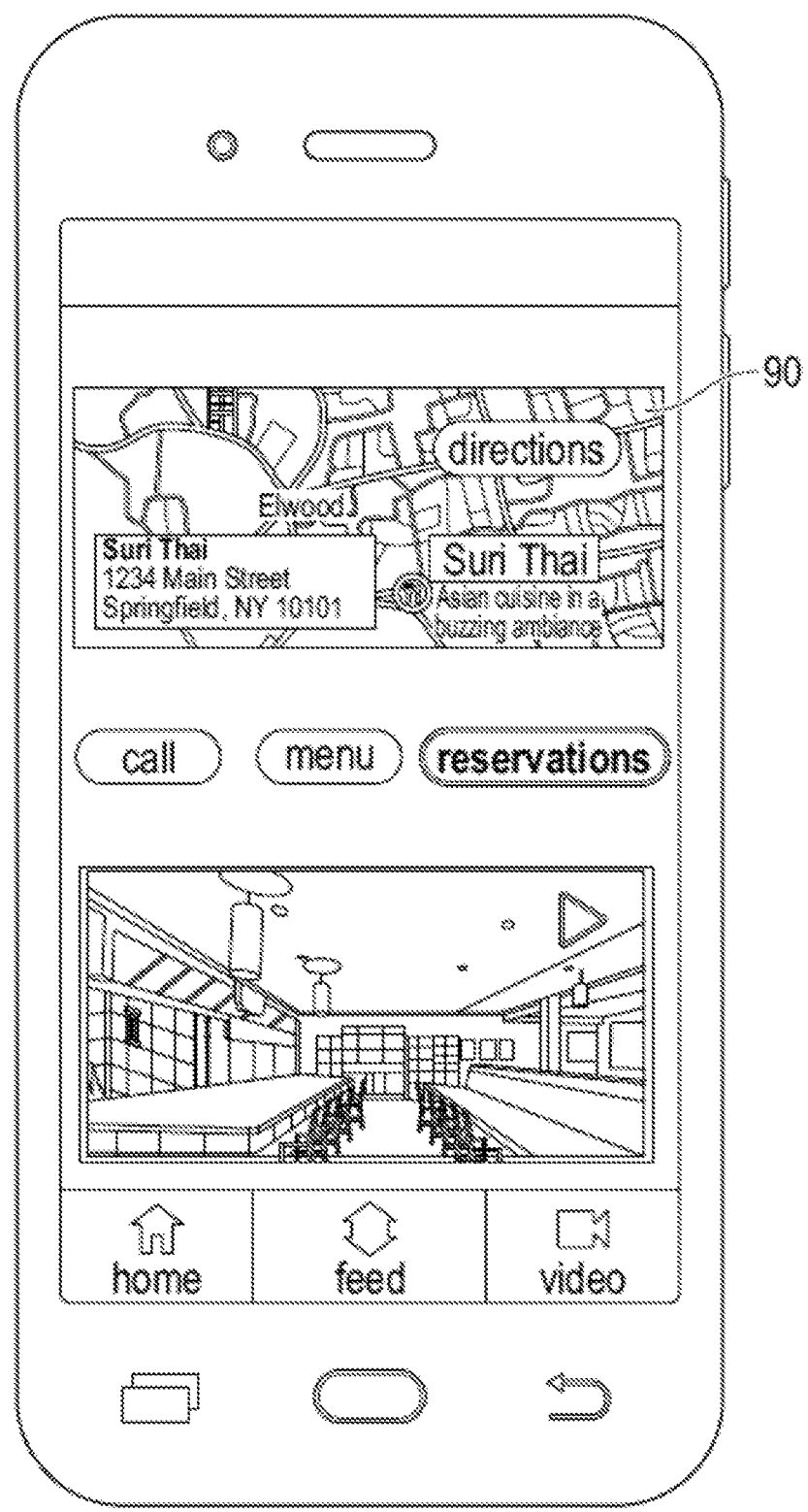

In FIG. 9, a restaurant page 90 is shown, whereby an eating establishment may, for example, but not limited to, host a preview video clip, enable phone contact, post a menu, and permit reservations be made. This embodiment may be integrated into another embodiment (dating, for example), or serve as a standalone software application.

FIG. 10 illustrates the connectivity of the parties, whether they are end user, or advertiser, for example, through computer devices 20 with internet connectivity 500 and access to a central server 400.

As to a further discussion of the manner of usage and operation of the present invention, the same should be apparent from the above description. Accordingly, no further discussion relating to the manner of usage and operation will be provided. With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

That which is claimed is:

1. A computer-based method for providing a profiled video preview and matching, the method comprising:
receiving, by a computer processor, user data and at least one user video clip associated with a user;
receiving user rating history data;
associating the user with a similar rating group (SRG) based on the user rating history data, wherein the SRG includes a plurality of users with similar rating history data;
performing a search based on the user data and the SRG to select a plurality of matching items, the plurality of matching items including a plurality of items previously rated by the plurality of users of the SRG;
displaying, to the user in a user feed, a continuous stream of a plurality of matching profiles corresponding to the plurality of matching items, the plurality of matching items being associated with a plurality of preview videos and a plurality of descriptions; presenting, to the user, the plurality of preview videos and the plurality of descriptions for a review;

receiving, from the user, ratings of the plurality of matching items presented in the plurality of preview videos and the plurality of descriptions and user feedback with regard to the plurality of matching items;

receiving, from the user, matching priorities for the plurality of matching items, wherein the matching priorities include options match criteria, common term matching criteria, distance criteria, and attribute category communal feedback criteria;

based on the matching priorities, identifying one or more of the plurality of matching items, wherein the identifying includes:

when the options match criteria associated with the one or more of the plurality of matching items is more than a first predetermined value, selecting the one or more of the plurality of matching items, wherein when the options match criteria is less than the first predetermined value, selecting the common term matching criteria, wherein options associated with the options match criteria are selected by the user;

when the common term matching criteria associated with the one or more of the plurality of matching items is more than a second predetermined value, selecting the one or more of the plurality of matching items, wherein when the common term matching criteria is less than the second predetermined value, selecting the distance criteria;

when the distance criteria associated with the one or more of the plurality of matching items is more than a third predetermined value, selecting the one or more of the plurality of matching items, wherein when the distance criteria is less than the third predetermined value, selecting the attribute category communal feedback criteria; and when the attribute category communal feedback criteria associated with the one or more of the plurality of matching items is more than a fourth predetermined value, selecting the one or more of the plurality of matching items;

based on the matching priorities, the ratings, and the user feedback, selectively presenting, to the user for viewing, a full video associated with one of the plurality of preview videos, the full video being associated with the one or more of the plurality of matching items and one of the plurality of users of the SRG;

receiving, from the one of the plurality of users of the SRG, a request to establish a video communication with the user, the request including viewing, by the one of the plurality of users of the SRG, the at least one user video clip associated with the user;

in response to the viewing, by the user, the full video associated with the one of the plurality of users of the SRG and the viewing, by the one of the plurality of users of the SRG, the at least one user video clip associated with the user, establishing a video communication between the user and the one of the plurality of users of the SRG, wherein first personal information associated with the user is made available to the one of the plurality of users of the SRG and second personal information associated with the one of the plurality of users of the SRG is made available to the user upon the establishment of the video communication;

detecting one or more key words during the video communication; based on the user data and data associated with the SRG, determining shared interests, the shared interests including interests shared by the user and the one of the plurality of users of the SRG;

in response to the detection of the one or more key words, selectively providing, by the computer processor, based on the one or more key words and the shared interests, real time suggestions during the video communication, the real time suggestions including at least one or more hints to assist the user in the video communication;

selectively updating the user rating history data based on the user feedback with regard to the plurality of matching items in the plurality of preview videos; and selectively updating the SRG associated with the user based on the updated user rating history data.

2. The method of claim 1, wherein the search is performed based on one or more of the following: match criteria, common term matching, a distance, and matching priorities.

3. The method of claim 1, wherein the real time suggestions are provided by an in-application assistant and further include one or more of the following: a common activity and a conversational point based upon shared interests.

4. The method of claim 3, wherein the conversational point is provided at set intervals, via a text chat or a live video chat, the conversational point being provided upon detection of the one or more key words, a term, a phrase in the text chat or the live video chat.

5. The method of claim 1, the plurality of matching profiles are selected based on weights and values associated with a plurality of parameters.

6. The method of claim 1, wherein the real time suggestions are based on one or more of the following: user profile data, shared interests, hobbies, historical interactions, and current interactions.

7. The method of claim 1, further comprising generating a profile for the user based upon the user data, creating a video to promote at least one of the user, a product, and a service, and labeling the user profile with terms.

8. The method of claim 1, wherein the search is performed by entering search criteria and matching search terms to identifying labels.

9. The method of claim 8, wherein the identifying labels associated with the plurality of matching items in the plurality of preview videos include a plurality of descriptive terms associated with the plurality of matching items.

10. The method of claim 1, wherein the video communication is maintained as long as participating users rate the video communication as satisfactory.

11. The method of claim 1, wherein each of the ratings include general numerical ratings or ratings per an attribute of a plurality of attributes.

12. The method of claim 11, wherein the plurality of attributes include one or more of the following: an appearance, a composure, and a personality.

13. The method of claim 1, wherein the plurality of matching items in the plurality of preview videos includes one of the following: an individual, a product, and a service.

14. A system for providing a profiled video preview and matching, the system comprising:
 a computer processor;
 a memory in communication with the computer processor; and
 an input/output (I/O) device in communication with the computer processor;
 wherein the computer processor is configured to:

receive user data and at least one user video clip associated with a user;
receive user rating history data;
associate the user with a similar rating group (SRG) based on the user rating history data; wherein the SRG includes a plurality of users with similar rating history data;
perform a search based on the user data and the SRG to select a plurality of matching items, the plurality of matching items including a plurality of items previously rated by the plurality of users of the SRG;
display, to the user in a user feed, a continuous stream of a plurality of matching profiles corresponding to the plurality of matching items, the plurality of matching profiles being associated with a plurality of preview videos and a plurality of descriptions;
presenting, to the user, the plurality of preview videos and the plurality of descriptions for a review;
receive, from the user, ratings the plurality of matching items presented in the plurality of preview videos and the plurality of descriptions and a user feedback with regard to the plurality of matching items;
receive, from the user, matching priorities for the plurality of matching items, wherein the matching priorities include options match criteria, common term matching criteria, distance criteria, and attribute category communal feedback criteria;
based on the matching priorities, identify one or more of the plurality of matching items, wherein the identifying includes:
  when the options match criteria associated with the one or more of the plurality of matching items is more than a first predetermined value, selecting the one or more of the plurality of matching items, wherein when the options match criteria is less than the first predetermined value, selecting the common term matching criteria, wherein options associated with the options match criteria are selected by the user:
  when the common term matching criteria associated with the one or more of the plurality of matching items is more than a second predetermined value, selecting the one or more of the plurality of matching items, wherein when the common term matching criteria is less than the second predetermined value, selecting the distance criteria;
  when the distance criteria associated with the one or more of the plurality of matching items is more than a third predetermined value, selecting the one or more of the plurality of matching items, wherein when the distance criteria is less than the third predetermined value, selecting the attribute category communal feedback criteria; and
  when the attribute category communal feedback criteria associated with the one or more of the plurality of matching items is more than a fourth predetermined value, selecting the one or more of the plurality of matching items;
based on the matching priorities, the ratings, and the user feedback, selectively presenting, to the user for viewing, a full video associated with one of the plurality of preview videos, the full video being associated with one of the plurality of matching items, the full video being associated with the one or more of the plurality of matching items one of the plurality of users of the SRG;
receive, from the one of the plurality of users of the SRG, a request to establish a video communication with the user, the request including viewing, by the one of the plurality of users of the SRG, the at least one user video clip associated with the user;
in response to the viewing, by the user, the fun video associated with the one of the plurality of users of the SRG and the viewing, by the one of the plurality of users of the SRG, the at least one user video clip associated with the user, establish a video communication between the user and the one of the plurality of users of the SRG, wherein first personal information associated with the user is made available to the one of the plurality of users of the SRG and second personal information associated with the one of the plurality of users of the SRG is made available to the user upon the establishment of the video communication;
detect one or more key words during the video communication;
based on the user data and data associated with the SRG, determine shared interests, the shared interests including interests shared by the user and the one of the plurality of users of the SRG;
in response to the detection of the one or more key words, selectively provide, based on the one or more key words and the shared interests, real time suggestions during the video communication, the real time suggestions including at least one or more hints to assist the user in the video communication;
selectively update the user rating history data based on the user feedback with regard to the plurality of matching items in the plurality of preview videos; and
selectively update the SRG associated with the user based on the updated user rating history data.

15. The system of claim 14, wherein the user data includes one or more of the following: user profile data, user match criteria, and labels associated with the user.

16. The system of claim 15, wherein the user profile data includes one or more of the following: a name, gender, a date of birth, a location, a qualification, a skit set, a profession, a hobby, an interest, and a preferred language.

17. The system of claim 14, the plurality of matching profiles are selected based on weights and values associated with a plurality of parameters.

18. The system of claim 14, wherein the real time suggestions are based on one or more of the following: user profile data, shared interests, hobbies, historical interactions, and current interactions.

19. The system of claim 14, wherein the search is performed by entering search criteria and matching search terms to identifying labels.

20. The system of claim 19, wherein the identifying labels associated with the plurality of matching items in the plurality of preview videos include a plurality of descriptive terms associated with the plurality of matching items.

* * * * *